United States Patent

Nani et al.

[11] Patent Number: 5,958,093
[45] Date of Patent: Sep. 28, 1999

[54] SELF-CLEANING FILTER FOR PNEUMATIC CIRCUITS

[75] Inventors: Eros Nani, Ciserano Zingonia; Andrea Bonandrini, Pontoglio, both of Italy

[73] Assignee: Mazzini ICI S.p.A., Ciserano Zingonia, Italy

[21] Appl. No.: 08/913,382
[22] PCT Filed: Mar. 15, 1996
[86] PCT No.: PCT/IT96/00048
  § 371 Date: Sep. 29, 1997
  § 102(e) Date: Sep. 29, 1997
[87] PCT Pub. No.: WO96/29139
  PCT Pub. Date: Sep. 26, 1996

[30] Foreign Application Priority Data

Mar. 20, 1995 [IT] Italy ................................ MI95A0546

[51] Int. Cl.⁶ ................................................ B01D 46/04
[52] U.S. Cl. .............................. 55/290; 55/293; 55/302
[58] Field of Search ............................ 55/283, 284, 290, 55/293, 294, 301, 302, 303; 95/279, 280

[56] References Cited

U.S. PATENT DOCUMENTS

| | | | |
|---|---|---|---|
| 2,500,747 | 3/1950 | Ellis | 55/294 |
| 3,345,805 | 10/1967 | Sherrill | 55/294 |
| 3,472,002 | 10/1969 | Brown et al. | 55/294 |
| 3,483,675 | 12/1969 | King, Jr. | 55/290 |
| 3,499,267 | 3/1970 | King, Jr. et al. | 55/294 |
| 3,606,735 | 9/1971 | Baigas, Jr. | 55/290 |
| 3,667,195 | 6/1972 | Angilly, Jr. et al. | 55/290 |
| 4,222,754 | 9/1980 | Horvat | 55/290 |
| 4,253,855 | 3/1981 | Jackson et al. | 55/290 |
| 4,481,021 | 11/1984 | Kinney, Jr. et al. | 55/290 |
| 4,826,512 | 5/1989 | Fuller | 55/283 |
| 4,830,642 | 5/1989 | Tatge et al. | 55/273 |
| 4,842,624 | 6/1989 | Barton | 55/293 |

FOREIGN PATENT DOCUMENTS

| | | |
|---|---|---|
| 0 389 045 | 9/1990 | European Pat. Off. . |
| 687.742 | 8/1930 | France . |
| 1.169.435 | 12/1958 | France . |
| 2736 | 8/1911 | United Kingdom . |

*Primary Examiner*—Duane S. Smith
*Attorney, Agent, or Firm*—Panitch Schwarze Jacobs & Nadel, P.C.

[57] ABSTRACT

A self-cleaning filter for pneumatic circuits includes a filtering baffle (1) mounted on a drum (2) rotated steadily, the flow (A) of the air to be filtered being from outside to inside the baffle (1), as well as a suction mouth (5) longitudinally positioned in the vertical mid-plane at the lowest point of the baffle (1) and externally adjacent thereto, and a blowing nozzle (6) internally adjacent to the baffle (1) at a position exactly opposite the mouth (5), both the mouth (5) and the nozzle (6) extending along the whole length of the filtering baffle (1). The nozzle (6) has a plurality of aligned bores suitable to emit a narrow jet of counter-current air, with adjustable incidence, and the mouth (5) is shaped as a trapezoidal hopper with a small adjustable blowing nozzle (C) at one end.

7 Claims, 1 Drawing Sheet

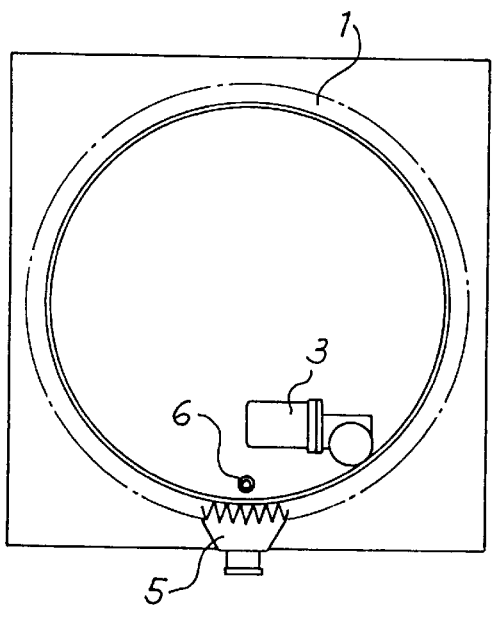
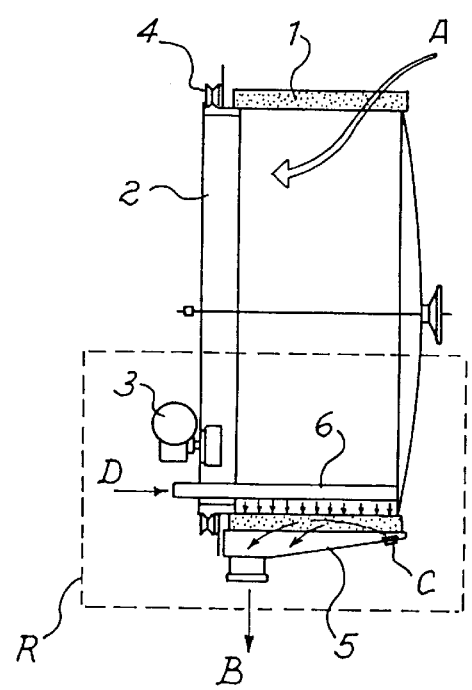
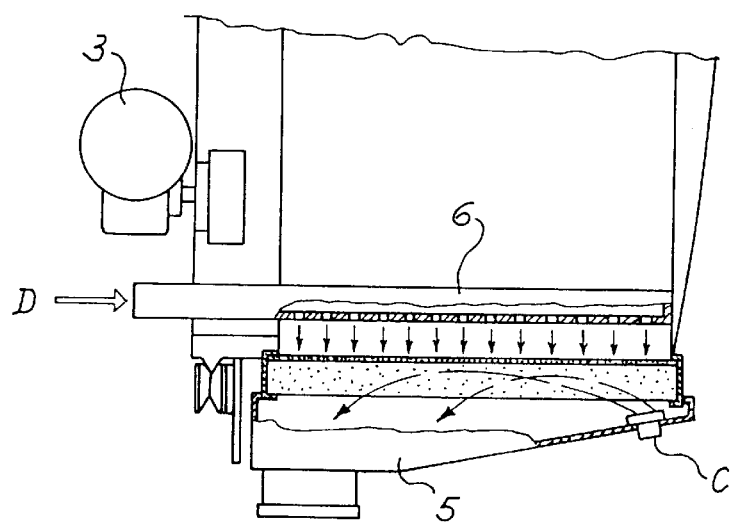

SELF-CLEANING FILTER FOR PNEUMATIC CIRCUITS

BACKGROUND OF THE INVENTION

The present invention relates to filters used in pneumatic circuits, and in particular to a self-cleaning filter intended mainly, but not exclusively, for filtering air.

It is known that various industrial plants use air to drain away processing wastes and/or for different kinds of treatments, and they include devices for filtering the air polluted by particles or substances of various origin. Reference will be made hereafter to filters employed in particular in the textile industries plants, being clear that the following is valid also for other similar applications.

It is known that conventional self-cleaning filters essentially consist of a drum housed in a case and covered with a continuous filtering element or baffle. This drum is provided with a relative motion with respect to a suction mouth located on the air inlet side and/or with respect to a blowing nozzle located on the opposite side. The relative motion is usually achieved by rotating the drum around mouths which are fixed or longitudinally shifting at most. Obviously, it is also possible to keep the drum still and rotate/shift the mouths.

The function of the suction mouth on the air inlet side is to suck up dust, wastes, etc. which deposit on said side of the filtering baffle. However, the effectiveness of said mouth is good only in case the filtering baffle is flat, so that the mouth can be positioned close to the baffle. On the contrary, in the most common case of pleated baffle (which increases the filtering surface with the same bulkiness) the bottom areas of the pleats are not adequately cleaned, thus reducing the advantage coming from the pleating.

In this case, in order to improve the baffle cleaning there is adopted a blowing nozzle, possibly rotating, which is usually located inside the drum. This nozzle intermittently emits a strong jet of compressed air which causes the dust to fall on the bottom of the filter case thanks to the counter-pressure. Such a cleaning system is based on the instantaneous shaking and on the temporary inversion of direction of the air flow through the baffle, however it has a limited effectiveness too.

In fact, first of all it can not be applied in a continuous way since it momentarily blocks the incoming air flow. Moreover, its action is not localized but general, whereby it is not particularly effective at the bottom of the baffle pleats where the suction mouth does not arrive.

A more effective type of filter is disclosed in US-A4.253.855, including a suction mouth and a blowing nozzle located adjacent to the baffle at mutually opposite positions and extending along the whole length thereof. This arrangement allows a better cleaning of the baffle but still is not completely satisfactory for particularly difficult types of filtration, e.g. the filtration of cotton fibers by means of a pleated baffle.

SUMMARY OF THE INVENTION

Therefore the object of the present invention is to provide a self-cleaning filter suitable to overcome the drawbacks of prior art filters.

This object is achieved by means of a filter for pneumatic circuits including a filtering baffle mounted on a steadily rotated drum, the flow of air to be filtered being from outside to inside of the baffle, with a suction mouth and a blowing nozzle located respectively outside and inside the baffle at mutually opposite positions adjacent thereto and extending along the whole length of the baffle, wherein the nozzle emits a jet of air whose angle of incidence with respect to the surface of the baffle is adjustable.

The main advantage of the filter according to the present invention is its capacity of complete self-regeneration even in the remotest areas at the bottom of the filtering baffle pleats.

BRIEF DESCRIPTION OF THE DRAWINGS

This and other advantages and characteristics of the self-cleaning filter according to the present invention will be clear to those skilled in the art from the following detailed description of an embodiment thereof, with reference to the annexed drawings wherein:

FIG. 1 is a schematic front view of a filter according to the invention;

FIG. 2 is a schematic partially sectional side view of the filter of FIG. 1; and FIG. 3 is an enlargement of portion R of FIG. 2.

DETAILED DESCRIPTION OF THE INVENTION

Referring to FIG. 1 and 2, there is seen that a self-cleaning filter according to the present invention includes a filter element 1 mounted on a drum 2 which is rotated steadily by a motor-reducer 3 through a friction pulley which acts on the inner surface of drum 2. The outer surface of drum 2 also has a rib which engages with corresponding guide rollers 4.

A suction mouth 5 is longitudinally positioned in the vertical mid-plane outside the filter element 1, at the lowest point of the filter element and adjacent thereto. A blowing nozzle 6 is located at an exactly opposite position inside the filter element 1. As better seen in the enlarged view of FIG. 3, both the suction mouth 5 and the blowing nozzle 6 extend along the whole length of the filter element 1. In particular, nozzle 6 has a "flute" structure, i.e. a plurality of bores aligned along the whole length of filter element 1, suitable to emit a narrow jet of air. On the other hand, mouth 5 is shaped as a trapezoidal hopper with the suction duct at its lowest end. A small adjustable blowing nozzle C is located at the opposite end of mouth 5.

The air flow to be filtered passes through filter element 1 from outside to inside, as indicated, by arrow A in fig.2. The mouth 5 isolates a small portion of the filter element 1 and sucks up therefrom the material deposited on the outer surface, which is gathered in the hopper and removed by the suction flow B. In order to improve the effectiveness of said cleaning, especially in case of damp and/or adhesive dusts, the small nozzle C intermittently acts with an oriented jet which helps the removal of the material.

The complete regeneration of the filter element 1 is achieved through the timed action of the inner blowing nozzle 6 with a flow D of counter-current compressed air. The air blade which comes from nozzle 6 removes the dust from the bottom of the pleats and conveys it to mouth 5. In order to generate vibrations on filter 1 which facilitate the dust removal, nozzle 6 has an adjustable incidence, i.e. it emits a jet of air at different angles with respect to the surface of the filter.

Thanks to the localized nature of the jet, and since also nozzle 6 is placed adjacent to the filter element 1 and at the suction mouth 5, said counter-current jet does not interfere with the normal flow A of the incoming air. Therefore, it is possible to regenerate deeply the filter element 1 even when it is of the pleated type, without disturbing the normal operation of the filter.

It is clear that the above-described and illustrated embodiment of the self-cleaning filter according to the invention is just an example susceptible of various modifications. In particular, the exact shape of mouth 5 and nozzle, 6 can be freely adapted according to specific needs, as long as their mutual position and with respect to the filter element 1, as well as their length equal to the filter element length, are maintained.

We claim:

1. A self-cleaning filter for pneumatic circuits including a filter element (1) mounted on a drum (2) rotated steadily, the flow (A) of the air to be filtered being from outside to inside said filter element (1), as well as a suction mouth (5) and a blowing nozzle (6) respectively located outside and inside the filter element (1) at mutually opposite positions adjacent thereto and extending along the whole length of the filter element (1), characterized in that said nozzle (6) emits a jet of air, the jet of air having an angle of incidence with respect to the surface of the filter element (1) which is adjustable by movement of the nozzle (6) about a longitudinal axis of said nozzle (6) to generate vibration on the surface of the filter element (1).

2. A self-cleaning filter according to claim 1, characterized in that the mouth (5) is shaped as a trapezoidal hopper, with a suction duct at the lowest end and a small adjustable blowing nozzle (C) located at the opposite end.

3. A self-cleaning filter according to claim 1, characterized in that the blowing nozzle (6) includes a plurality of aligned bores.

4. A self-cleaning filter according to claim 1 characterized in that the filter element (1) has a pleated surface.

5. A self-cleaning filter according to claim 2, characterized in that the blowing nozzle (6) includes a plurality of aligned bores.

6. A self-cleaning filter according to claim 2, characterized in that the filter element (1) has a pleated surface.

7. A self-cleaning filter according to claim 3, characterized in that the filter element (1) has a pleated surface.

* * * * *